United States Patent
Pichler et al.

(10) Patent No.: US 9,222,565 B2
(45) Date of Patent: Dec. 29, 2015

(54) TORQUE TRANSMISSION DEVICE

(75) Inventors: Stefan Pichler, Landskron (AT); Ferdinand Tangl, Hart bei Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 81 days.

(21) Appl. No.: 13/817,197

(22) PCT Filed: Aug. 8, 2011

(86) PCT No.: PCT/EP2011/063585
§ 371 (c)(1),
(2), (4) Date: Feb. 15, 2013

(87) PCT Pub. No.: WO2012/022640
PCT Pub. Date: Feb. 23, 2012

(65) Prior Publication Data
US 2013/0303327 A1 Nov. 14, 2013

(30) Foreign Application Priority Data
Aug. 18, 2010 (DE) .......................... 10 2010 034 691

(51) Int. Cl.
*B60K 20/00* (2006.01)
*F16H 48/20* (2012.01)
*F16H 48/22* (2006.01)
*B60T 1/00* (2006.01)
*F16H 63/34* (2006.01)
*B60K 1/00* (2006.01)

(52) U.S. Cl.
CPC ............... *F16H 48/22* (2013.01); *B60T 1/005* (2013.01); *F16H 63/3425* (2013.01); *B60K 2001/001* (2013.01)

(58) Field of Classification Search
CPC ........................................... F16H 63/3425
USPC .................. 475/221, 150; 192/219.5
See application file for complete search history.

(56) References Cited

U.S. PATENT DOCUMENTS

| 4,369,867 | A | 1/1983 | Lemieux |
| 6,588,294 | B1* | 7/2003 | Rogg .................... 74/473.21 |
| 6,827,663 | B2* | 12/2004 | Tucker-Peake .......... 475/231 |
| 2005/0101428 | A1* | 5/2005 | Allen et al. ............. 475/221 |

FOREIGN PATENT DOCUMENTS

| DE | 43 05 055 A1 | 8/1994 |
| DE | 197 10 975 A1 | 9/1998 |
| DE | 101 31 735 A1 | 1/2003 |
| DE | 103 10 977 A1 | 9/2004 |

* cited by examiner

*Primary Examiner* — Sherry Estremsky
*Assistant Examiner* — Lillian Nguyen
(74) *Attorney, Agent, or Firm* — Jordan IP Law, LLC; Todd A. Vaughn

(57) ABSTRACT

A torque transmission device for a motor vehicle having a locking mechanism for locking at least one wheel of the motor vehicle, which wheel is connected to an output shaft of the torque transmission device.

17 Claims, 1 Drawing Sheet

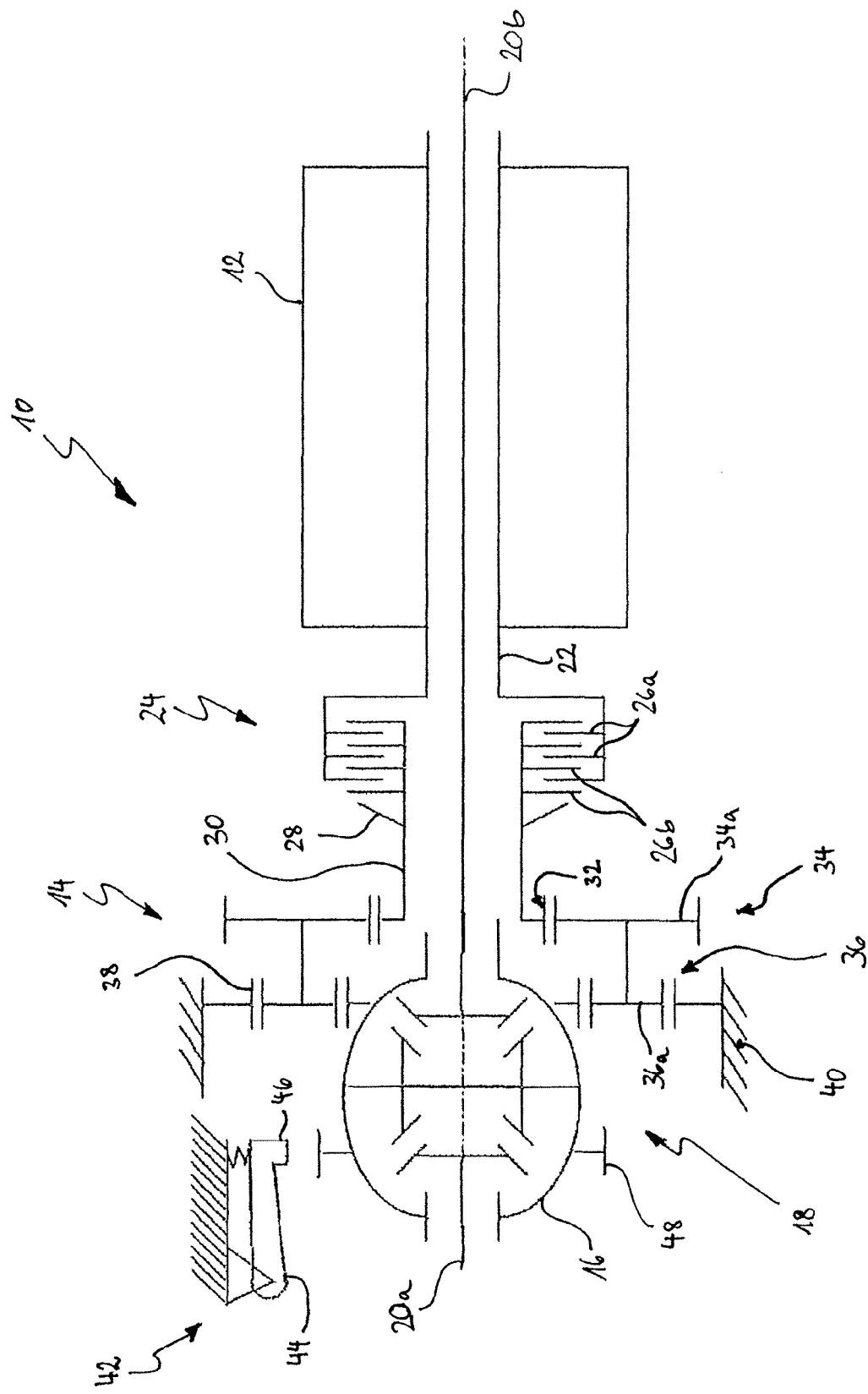

TORQUE TRANSMISSION DEVICE

CROSS-REFERENCE TO RELATED APPLICATIONS

The present application is a National Stage Application of PCT International Application No. PCT/EP2011/063585 (filed on Aug. 8, 2011), under 35 U.S.C. §371, which claims priority to German Patent Application No. 10 2010 034691.8 (filed on Aug. 18, 2010), which are each hereby incorporated by reference in their respective entireties.

TECHNICAL FIELD

Embodiments relate to a torque transmission device for a motor vehicle having a locking mechanism for locking at least one wheel of the motor vehicle, which wheel is connected to an output shaft of the torque transmission device.

BACKGROUND

Torque transmission devices of this type having a locking mechanism are used in a multiplicity of motor vehicle types, in particular in the case of electric or hybrid vehicles. The locking mechanism can serve, for example, as a parking lock, in order to prevent the vehicle from rolling away in a parked state. It is of particular significance here that the locking takes place reliably, with the result that securing of the vehicle is always ensured, even in the case of high loads which act on the locking mechanism, for example when the vehicle is parked on a slope. In addition, locking mechanisms of this type have to be designed in such a way that they can be engaged even if a vehicle is still rolling slowly. This requires a very robust design of the locking mechanism, which is associated with corresponding production costs.

SUMMARY

It is, therefore, an object of the invention to provide a torque transmission device which can be produced inexpensively and which makes reliable locking possible at the same time.

The abovementioned object and others are achieved by a torque transmission device having the features of a locking mechanism configured to lock at least one wheel of the motor vehicle; an output shaft configured for connection to the at least one wheel; a differential gear mechanism configured for connection to the output shaft; and a drive unit; a clutch unit configured to drive-connect the output shaft, the differential gear mechanism and the drive unit are drive-connected to one another; and a rotatable component operationally arranged between the wheel and the clutch unit and which is configured for engagement with the locking mechanism.

The torque transmission device in accordance with embodiments comprises a differential gear mechanism, which is connected to the output shaft, and a drive unit which are drive-connected to one another via a clutch unit. The locking mechanism of the torque transmission device can be brought into engagement with a rotatable component of the torque transmission device which is arranged functionally between the wheel of the vehicle and the clutch unit.

In other words, the locking mechanism is not provided in functional terms between the drive unit and the clutch unit, but rather lies "behind" the clutch unit as viewed from the drive unit. At least partial decoupling of the drive unit from the at least one wheel is achieved in the locked state as a result of the positioning of the clutch unit between the drive unit and the locking mechanism, without the forces which act on the torque transmission device in the case of a load (for example, if the vehicle is parked on a slope) having to be absorbed by the clutch unit. The locking mechanism which is arranged functionally between the wheel and the clutch unit is therefore arranged "in front of" the clutch unit and in every case ensures reliable locking independently of a design of the clutch unit.

A further advantage of the above-described arrangement of the components of the torque transmission device consists in that the components which are arranged between the wheel and the locking mechanism and the components which are arranged between the locking mechanism and the drive unit are braked in a temporally offset manner if the locking mechanism is not activated during a rest state of all the components. In order to dimension the locking mechanism in such a way that reliable locking of the at least one wheel is ensured even in situations of this type, the sum of the forces which are produced by the braking of the components which lie "in front of" the locking mechanism and those which lie "behind" the locking mechanism usually has to be taken into consideration as the maximum loading which occurs. Since the rigidities of the involved components between the wheel and the locking mechanism are relatively low, it takes approximately half a second in the case of a slowly rolling vehicle from the latching of the locking mechanism until the first loading peak is reached.

In contrast, there are as a rule substantially higher rigidities between the locking mechanism and the drive unit, with the result that the loads which occur there in conjunction with latching of the locking mechanism are associated with higher-frequency oscillations. As a result of a suitable design of the clutch unit, the latter acts as a damping means which dissipates the oscillations which act between the locking mechanism and the drive unit within the abovementioned time period of approximately 0.5 second or at least modulates them temporally in such a way that the loading peaks which are produced by the components which lie "in front of" and "behind" the locking mechanism do not act at the same time on the locking mechanism. It is therefore not the sum of the two loads which has to be used for dimensioning of the locking mechanism, but rather merely the higher of the two loads.

Although the advantages of the torque transmission device in accordance with embodiments have been described only by way of example using a motor vehicle, it goes without saying that the discussed torque transmission device can in principle also be used in other fields.

In accordance with one advantageous embodiment of the present invention, the locking mechanism comprises a detent which can be brought into engagement in a positively locking manner with a detent gear which is connected fixedly to the rotatable component so as to rotate with it. A locking mechanism of this type can be implemented in a structurally simple manner and at the same time ensures reliable locking of the rotatable component relative to the locking mechanism. In particular, the detent is fastened pivotably to a housing of the torque transmission device and is configured in such a way that locking and releasing can be realized by a pivoting movement of the detent.

The rotatable component can be a component of the differential gear mechanism, in particular a cage of the differential gear mechanism.

In accordance with a further advantageous refinement of the torque transmission device according to the invention, the clutch unit comprises a slipping clutch. The slipping clutch can be, for example, a multiple disk clutch. Clutch units of this type are inexpensive and reliable and are available in a very wide variety of different embodiments. The above-described adaptation of the damping characteristic in the region between the locking mechanism and the drive unit is therefore possible in a simple way by the selection of a clutch unit with suitable performance parameters.

It can be provided that the torque transmission device comprises a step-up or step-down gear mechanism which is drive-connected on the input side to the drive unit and which is connected on the output side to the differential gear mechanism, the step-up or step-down gear mechanism being configured, in particular, as a planetary gear mechanism. In particular, the clutch unit is arranged functionally between the step-up or step-down gear mechanism and the drive unit.

Furthermore, it can be provided that the clutch unit comprises an input shaft and an output shaft, the input shaft being connected to a rotor of the drive unit which is configured as an electric motor, and the output shaft being drive-connected directly or indirectly to an input member of the differential gear mechanism. As a result, a compact and reliable overall design can be realized.

Further embodiments of the invention are specified in the description, the drawing and the subclaims.

DRAWING

In the following text, the invention will be described purely by way of example using one advantageous embodiment with reference to the appended drawing.

FIG. 1 illustrates a torque transmission device in accordance with embodiments.

DESCRIPTION

FIG. 1 illustrates a motor/gear mechanism unit 10 which comprises an electric motor 12 which is drive-connected via a step-down gear mechanism 14 to a cage 16 of a differential gear mechanism 18. A drive of the differential gear mechanism 18 makes it possible to deliver the torque which is generated by the electric motor 12 to half shafts 20a, 20b which are connected to wheels (not shown) of a motor vehicle. The electric motor 12 has a rotor which is connected fixedly to a hollow shaft 22 so as to rotate with it. The hollow shaft 22 is connected to a slipping clutch 24 which is arranged functionally between the electric motor 12 and the step-down gear mechanism 14. The slipping clutch 24 is configured as a multiple disk clutch and comprises outer disks 26a and inner disks 26b which are arranged in an alternating manner and form a multiple disk assembly. A disk spring 28 presses the disks 26a, 26b against one another with a predefined force, in order to provide well defined coupling between the hollow shaft 22, which surrounds the half shaft 20b coaxially, and an input shaft 30 of the step-down gear mechanism 14.

The step-down gear mechanism 14 is configured as a two-stage planetary gear mechanism. The input shaft 30 is connected fixedly to a sun gear 32 so as to rotate with it, which sun gear 32 in turn meshes with a first planetary gear set 34. Gearwheels 34a of the first planetary gear set 34 are in each case connected fixedly to a gearwheel 36a of a second planetary gear set 36 so as to rotate with it, the gearwheels 34a having a greater diameter than the gearwheels 36a. The gearwheels 36a of the second planetary gear set 36 mesh with an internal gear 38 which is fastened to a housing 40 which surrounds the step-down gear mechanism 14 at least partially.

During operation of the electric motor 12, a torque is transmitted via the clutch 24 and the gear mechanism 14 to the differential gear mechanism 18, since the gearwheels 36a which are mounted together with the gearwheels 34a on a planetary carrier (not shown) roll on the internal gear 38, and therefore, at the same time drive the differential cage 16 to produce a rotational movement.

If the vehicle having the motor/gear mechanism unit 10 is parked on a slope, it would roll backward, since, in a powerless state, the electric motor 12 does not produce a relevant resistance which would decisively inhibit a rotational movement of the above-described components. In order to prevent the vehicle from rolling backward, a parking lock 42 is provided which comprises a detent 44. The detent 44 has at least one detent tooth 46 which can be brought into a positively locking engagement with a toothing system of complementary configuration of a detent gear 48. The detent gear 48 is in turn arranged fixedly on the differential cage 16 so as to rotate with it.

If the parking position of the vehicle is to be secured, the parking lock 42 is activated and the detent 44 is brought into engagement with the detent gear 48 by way of a suitable actuation mechanism, said detent gear therefore being secured in a rotationally fixed manner. As a result, a rotation of the differential cage 16, and therefore, of the half shafts 20a, 20b, is also impeded. In other words, the vehicle can no longer be moved, since the parking lock 42 blocks the differential gear mechanism 18 directly. The locking is very reliable, since it is independent of the properties of the slipping clutch 24 which is arranged functionally "behind" the parking lock 42 when a parked state of the vehicle is considered.

The above-described position of the slipping clutch 24 relative to the other components of the motor/gear mechanism unit 10 is associated with the further advantage that the parking lock 42 has to be designed for lower loads than in the case of conventional motor/gear mechanism units. If namely the vehicle is still moving a little upon activation of the parking lock 42, loads which, coming from the wheels, are transmitted via the differential gear mechanism 18 to the parking lock 42, therefore, act on the components of the parking lock 42. Said loads are added to by loads which are generated by the components between the parking lock 42 and the electric motor 12, since said components also have to be braked. If the peaks of the two loads overlap temporally, the two loads are added together. As a result, the parking lock 42 has to be of correspondingly robust design.

By way of the functional position of the slipping clutch 24 between the electric motor 12 and the parking lock 42, the rigidity of this "part" of the motor/gear mechanism unit 10 can be influenced. That is to say, the loads which are associated with the braking of the components which are arranged in this region and the resulting oscillations are damped by the slipping clutch 24 in such a way that they have already substantially decayed when the load peaks act on the parking lock 42, which load peaks occur only after approximately half a second on account of the lower rigidity of the system between the wheels and the parking lock 42. The load peaks are therefore not added together and the maximum loading to be absorbed by the parking lock 42 is substantially lower than in conventional systems. Accordingly, the parking lock 42 can be of simpler configuration, which leads to savings of installation space and cost advantages.

LIST OF REFERENCE SIGNS

10 Motor/gear mechanism unit
12 Electric motor
14 Step-down gear mechanism
16 Differential cage
18 Differential gear mechanism 20a, 20b Half shaft
22 Hollow shaft
24 Slipping clutch
26a Outer disk
26b Inner disk
28 Disk spring
30 Input shaft
32 Sun gear
34 First planetary gear set
36 Second planetary gear set
34a, 36a Gearwheel
38 Internal gear
40 Housing
42 Parking lock
44 Detent
46 Detent tooth

What is claimed is:

1. A torque transmission device for a motor vehicle, the torque transmission device comprising:
   a locking mechanism configured to lock at least one wheel of the motor vehicle;
   an output shaft configured for connection to the at least one wheel;
   a differential gear mechanism configured for connection to the output shaft; and
   a drive unit;
   a slipping clutch configured to drive-connect the output shaft, the differential gear mechanism and the drive unit to one another;
   a rotatable component operationally arranged between the wheel and the slipping clutch and which is configured for engagement with the locking mechanism; and
   a step-up gear mechanism, comprising a planetary gear mechanism, configured for drive-connection on an input side thereof to the drive unit and which is also configured for connection on an output side thereof to the differential gear mechanism.

2. The torque transmission device of claim 1, wherein the locking mechanism comprises a detent configured for engagement in a positively locking manner with a detent gear configured for a fixed connection to the rotatable component so as to rotate with the rotatable component.

3. The torque transmission device of claim 1, wherein the rotatable component comprises a component of the differential gear mechanism.

4. The torque transmission device of claim 3, wherein the component comprises a cage of the differential gear mechanism.

5. The torque transmission device of claim 1, wherein the slipping clutch comprises a multiple disk clutch.

6. The torque transmission device of claim 1, wherein the slipping clutch is operationally arranged between the step-up gear mechanism and the drive unit.

7. The torque transmission device of claim 6, wherein the slipping clutch comprises:
   an input shaft configured for connection to a rotor of the drive unit; and
   an output shaft configured for drive-connection to an input member of the differential gear mechanism.

8. The torque transmission device of claim 7, wherein the drive unit comprises an electric motor.

9. A torque transmission device for a motor vehicle, the torque transmission device comprising:
   a locking mechanism configured to lock at least one wheel of the motor vehicle;
   an output shaft configured for connection to the at least one wheel;
   a differential gear mechanism configured for connection to the output shaft, the differential gear mechanism having a cage configured for rotation and for engagement with the locking mechanism;
   a motor;
   a slipping clutch configured to drive-connect the output shaft, the differential gear mechanism and the motor to one another; and
   a step-up gear mechanism including a planetary gear mechanism configured for drive-connection on an input side thereof to the motor and connection on an output side thereof to the differential gear mechanism,
   wherein the cage is operationally arranged between the wheel and the slipping clutch.

10. The torque transmission device of claim 9, further comprising a step-up gear mechanism configured for drive-connection on an input side thereof to the motor and connection on an output side thereof to the differential gear mechanism.

11. The torque transmission device of claim 9, wherein:
   the slipping clutch is operationally arranged between the planetary gear mechanism and the motor; and
   the slipping clutch comprises:
      an input shaft configured for connection to a rotor of the motor; and
      an output shaft configured for drive-connection to an input member of the differential gear mechanism.

12. A torque transmission device for a motor vehicle, the torque transmission device comprising:
   an output shaft configured for connection to at least one wheel of the motor vehicle;
   a first gear mechanism to connect to the output shaft;
   a drive unit motor;
   a second gear mechanism arranged at a first end of the first gear mechanism to drive-connect a cage of the first gear mechanism to the drive unit;
   a clutch unit arranged between the second gear mechanism and the drive unit to drive-connect the output shaft, the first gear mechanism and the drive unit to one another; and
   a locking mechanism arranged at a second end of the first gear mechanism to lock the at least one wheel of the motor vehicle, the locking mechanism having a detent with at least one detent tooth to be brought to positively locking engagement with a detent gear arranged on the first gear mechanism,
   wherein the clutch unit is also arranged between the locking mechanism and the drive unit.

13. The torque transmission device of claim 12, wherein the drive unit comprises an electric motor.

14. The torque transmission device of claim 12, wherein the first gear mechanism comprises a differential gear mechanism.

15. The torque transmission device of claim 12, wherein the second gear mechanism comprises a step-down or step-up gear mechanism.

16. The torque transmission device of claim 12, wherein the detent gear is fixedly arranged on the cage of the first gear mechanism so as to rotate with it.

17. The torque transmission device of claim 12, wherein the clutch unit is a slipping clutch.

* * * * *